US 8,426,494 B2

(12) United States Patent
Fuqua et al.

(10) Patent No.: US 8,426,494 B2
(45) Date of Patent: Apr. 23, 2013

(54) LIGNITE URETHANE BASED RESINS FOR ENHANCED FOUNDRY SAND PERFORMANCE

(75) Inventors: Joseph M. Fuqua, Fond du Lac, WI (US); Paul Klein, Waukesha, WI (US)

(73) Assignee: Amcol International Corp., Hoffman Estates, IL (US)

( * ) Notice: Subject to any disclaimer, the term of this patent is extended or adjusted under 35 U.S.C. 154(b) by 405 days.

(21) Appl. No.: 12/574,501

(22) Filed: Oct. 6, 2009

(65) Prior Publication Data

US 2011/0079366 A1    Apr. 7, 2011

(51) Int. Cl.
 *B22C 1/22* (2006.01)
(52) U.S. Cl.
 USPC .................. 523/142; 523/139; 164/527
(58) Field of Classification Search ............. 523/142, 523/139; 164/527
 See application file for complete search history.

(56) References Cited

U.S. PATENT DOCUMENTS

| 3,023,113 A | 2/1962 | Barlow |
| 3,083,118 A | 3/1963 | Bridgeford |
| 3,330,686 A | 7/1967 | Rose |
| 3,409,579 A | 11/1968 | Robins |
| 3,429,848 A | 2/1969 | Robins |
| 3,432,457 A | 3/1969 | Robins |
| 3,445,251 A | 5/1969 | Nevins |
| 3,535,359 A | 10/1970 | Chadwick |
| 3,676,392 A | 7/1972 | Robins |
| 3,743,621 A | 7/1973 | Molotsky |
| 3,832,191 A | 8/1974 | Bolding et al. |
| 3,862,080 A | 1/1975 | Standen et al. |
| 3,925,296 A | 12/1975 | Stone et al. |
| 4,311,631 A | 1/1982 | Myers et al. |
| 4,359,339 A | 11/1982 | Van Fisk, Jr. |
| 4,361,181 A | 11/1982 | Wischnack et al. |
| 4,400,475 A | 8/1983 | Kennedy |
| 4,417,998 A | 11/1983 | Kennedy |
| 4,586,936 A | 5/1986 | Schaffer et al. |
| 4,597,878 A | 7/1986 | House et al. |
| 4,608,397 A | 8/1986 | Reischl |
| 4,705,570 A | 11/1987 | Paul et al. |
| 4,734,439 A | 3/1988 | Reischl |
| 4,735,973 A | 4/1988 | Brander |
| 4,801,621 A | 1/1989 | Reischl |
| 4,851,457 A | 7/1989 | Kurple |
| 4,855,052 A | 8/1989 | Reischl |
| 5,244,473 A | 9/1993 | Sardessai et al. |
| 5,376,696 A | 12/1994 | Dunnavant et al. |
| 5,430,072 A | 7/1995 | Muller et al. |
| 5,455,287 A | 10/1995 | Carpenter et al. |
| 5,585,428 A | 12/1996 | Quinn et al. |
| 5,611,853 A | 3/1997 | Morimoto |
| 5,616,628 A | 4/1997 | von Bonin et al. |
| 5,688,313 A | 11/1997 | Landis |
| 5,695,554 A | 12/1997 | Landis |
| 5,769,933 A | 6/1998 | Landis |
| 5,810,918 A | 9/1998 | Landis |
| 5,856,375 A | 1/1999 | Chang et al. |
| 5,859,091 A * | 1/1999 | Chen et al. ............... 523/140 |
| 5,911,269 A | 6/1999 | Brander et al. |
| 5,916,826 A | 6/1999 | White |
| 6,005,021 A | 12/1999 | Chen et al. |
| 6,136,888 A | 10/2000 | Torbus et al. |
| 6,264,775 B1 | 7/2001 | Holeschovsky et al. |
| 6,288,139 B1 | 9/2001 | Skoglund |
| 6,291,550 B1 | 9/2001 | Chen et al. |
| 6,506,223 B2 | 1/2003 | White |
| 6,506,817 B1 * | 1/2003 | Buchler ............... 523/139 |
| 6,509,392 B1 | 1/2003 | Jhaveri et al. |
| 6,554,049 B2 | 4/2003 | Steele et al. |
| 6,559,203 B2 | 5/2003 | Hutchings et al. |
| 6,719,835 B2 | 4/2004 | Brown |
| 6,772,820 B2 | 8/2004 | Roze et al. |
| 6,822,042 B2 | 11/2004 | Capps |
| 6,834,706 B2 | 12/2004 | Steele et al. |
| 6,846,849 B2 | 1/2005 | Capps |
| 6,972,302 B2 | 12/2005 | Baker et al. |
| 7,871,972 B2 | 1/2011 | SenGupta |
| 2004/0039235 A1 | 2/2004 | Bergstrom et al. |

(Continued)

FOREIGN PATENT DOCUMENTS

| CA | 843443 | 6/1970 |
| EP | 0 361 447 A2 | 4/1990 |

(Continued)

OTHER PUBLICATIONS

"What's in Product Data Base" (Consumer Product Information Database), pp. 167 (2001). URL:http://whatsinproducts.com/search_database_results.php.
Greene et al., Protective Groups in Organic Synthesis, John Wily & Sons (1999).
Jhurry et al., "Sucrose-Based Polymers: Polyurethanes with Sucrose in the Main Chain," *Eur. Polym. J.*, 33:1577-1582 (1997).
Visser et al., "Observations on the Dispersion and Aggregation of Clays by Humic Substances, I. Dispersive Effects of Humic Acids," *Geoderma*, 42(3-4):331-337 (1988). Abstract Only.
Monroe, Use of Iron in mold and core mixes for ferrous castings, AFS Transactions, 93: 355-364 (1985).
International search report and written opinion for International Application No. PCT/US12/33861, mailing date Jul. 17, 2012.

* cited by examiner

*Primary Examiner* — Vickey Nerangis
(74) *Attorney, Agent, or Firm* — Marshall, Gerstein & Borun LLP

(57) ABSTRACT

Described herein, in a preferred embodiment, is a leonardite-based polyurethane resin binder that may be used, among other applications, as a binder in combination with foundry aggregate, e.g., sand, for molding or casting metal parts. The binders described herein comprise a humic substance, preferably leonardite, first mixed with a foundry aggregate and then the humic-aggregate mixture is combined with a polymerizable polyol, an isocyanate, and a polymerization catalyst to make a polyurethane resin binder in situ in a foundry aggregate, such as sand. The lignite is added as a solid to the foundry aggregate, and improves the binder performance of the lignite-containing part of the binder components.

11 Claims, No Drawings

U.S. PATENT DOCUMENTS

| | | |
|---|---|---|
| 2005/0017394 A1 | 1/2005 | Hochsmann et al. |
| 2007/0281876 A1 | 12/2007 | Garner et al. |
| 2008/0277351 A1 | 11/2008 | Harman et al. |
| 2009/0162408 A1 | 6/2009 | SenGupta |
| 2009/0314461 A1 | 12/2009 | Attridge et al. |
| 2010/0319874 A1 | 12/2010 | Thiel et al. |
| 2011/0019044 A1 | 1/2011 | Wang et al. |
| 2011/0079366 A1 | 4/2011 | Fuqua et al. |
| 2011/0081270 A1 | 4/2011 | Fuqua |
| 2011/0082233 A1 | 4/2011 | SenGupta et al. |

FOREIGN PATENT DOCUMENTS

| | | |
|---|---|---|
| WO | WO-02/28937 A2 | 4/2002 |
| WO | WO-2009/065015 A1 | 5/2009 |
| WO | WO-2009/065018 A1 | 5/2009 |
| WO | WO-2009/126960 A2 | 10/2009 |
| WO | WO-2009/155242 A1 | 12/2009 |
| WO | WO-2011/044003 A2 | 4/2011 |
| WO | WO-2011/044004 A2 | 4/2011 |
| WO | WO-2011/044005 A1 | 4/2011 |

— # LIGNITE URETHANE BASED RESINS FOR ENHANCED FOUNDRY SAND PERFORMANCE

CROSS-REFERENCE TO RELATED APPLICATIONS

This application is related to and filed concurrent with copending U.S. patent application Ser. Nos. 12/574,475, 12/574,525 and 12/574,546.

TECHNICAL FIELD

This invention relates to foundry mixes, in particular those incorporating polymerizable resin binders, and processes for making foundry shapes by curing the binders in place, after forming a foundry mold or core.

BACKGROUND AND PRIOR ART

In the foundry art, sand casting is used to make metal parts. In sand casting, foundry shapes called molds, exterior casting forms, and cores, interior casting forms, are made from a mixture of a foundry aggregate, such as sand, and a binder. The two categories of sand molds are "green" and "rigid." Green sand molds are bonded with clay and water. Rigid sand molds are bonded with organic resins and can be hardened using one of several methods, including baking, curing with a chemical reagent, and flushing with a reactive gas. Molten metal is poured into and around the foundry shapes after they have hardened. The binders, e.g., phenol formaldehyde resins, or phenol-isocyanate (polyurethane) resins, used to form foundry shapes typically contain a significant amount of organic solvent, which can emit noxious fumes, as well as free reactants, e.g., formaldehyde or isocyanate and free phenol, that are detrimental to the cast metal and the foundry environment.

A urethane binder resin, when used in combination with a foundry aggregate such as sand, typically has three parts: a polymerizable polyol component, an isocyanate component, and a catalyst component. The polymerizable polyol compound, e.g., a polyol, such as ethylene glycol, and isocyanate react to form a cross-linked polymer which increases the tensile strength and/or hardness of the sand/binder mixture. The catalyst prompts the polymerizable components of the binder to polymerize, allowing for rapid conversion of the foundry mix into a hard and solid cured state suitable for forming shapes from molten metal poured therein.

The addition of other polyols to urethane based resin systems has been recently illustrated by Thiel in WO 2009/065018 A1. Therein, Thiel suggests that humic substances represent an alternative reactant to the conventional polyol component in reactions with isocyanates for the formation of binder resins. Generally, humic substances, e.g., humic acid, fulvic acid, hymatomelanic acid, ulmic acid, and humin, contain hydroxyl groups that are thought to react with an isocyanate to form polyurethane resins.

Humic acid has previously been included in foundry sand compositions, i.e. green sands. See U.S. Pat. Nos. 3,023,113 and 3,832,191. Humic acid is obtainable from multiple natural sources, including lignite, leonardite, peat, and manure. Lignite and leonardite are rich in humic acid and are easily accessible by mining. Lignite is an organic mineraloid that is the lowest rank of coal. Known as "brown coal," lignite has a high inherent moisture content of up to 66 percent and a high ash content compared to other forms of coal. Lignite has previously been used as an additive in foundry sand compositions, i.e. green sands, comprising an additional binding agent such as bentonite clay. See U.S. Pat. Nos. 3,445,251 and 4,359,339.

U.S. Pat. Nos. 3,023,113, 3,832,191, 3,445,251 and 4,359,339 teach the addition of humic substances to foundry aggregates in green sand applications. These patents teach that when the humic substance is mixed with a clay binder foundry shape performance is improved.

A humic substance-based urethane resin mix, described by Thiel, for use as a foundry sand binder was found to have a short shelf life, with gross separation (settling) of humic solids and/or to turn into a stiff (i.e. no fluidity) gel within a short duration of storage. The separation of the humic solid prevents the ready standardization of the addition of the humic solids to foundry aggregate over the course of normal foundry mold and core production. These variations in the composition of the foundry mix can affect casting performance of the foundry shape thereby impacting the cost and quality of the resultant casting in a negative manner.

No patent or application teaches the direct addition of humic solids to foundry aggregates in rigid sand mold applications. Moreover, there is no teaching that one can provide a consistent and repeatable amount of humic solids to the foundry mix by providing direct addition of the humic solid to the foundry aggregate. The resin components and molding described herein include a humic substance, e.g., a lignite, e.g., leonardite and a polyol-isocyanate resin binder, wherein a solid lignite containing up to about 25 wt. % water, based on the dry weight of the lignite, is mixed into the foundry aggregate. The lignite component is mixed into the foundry aggregate as a solid having a long shelf life for convenient use at a foundry. It has been found that improved properties result from mixing the lignite in dry form (less than 15% moisture) into the foundry sand with separate addition of polyol, isocyanate and catalyst.

SUMMARY

Described herein, in the preferred embodiment, is a polyurethane resin binder system that is used as a binder in combination with a mixture of a lignite and a foundry aggregate, e.g., sand, for molding or casting metal parts. The binders described herein can be used to make foundry shapes (molds and cores) using separate components of (a) a lignite, as a solid, mixed with the foundry aggregate, e.g., sand, (b) a polymerizable polyol; (c) a polymerizable isocyanate and (d) a urethane polymerization catalyst. Preferably, the polyol, isocyanate and catalyst are added to the lignite-foundry aggregate just prior to the formation of the foundry shape.

Using a humic substance, particularly leonardite, as one component of a binder system presents advantages over conventional binders, but liquid-lignite suspensions can exhibit poor stability. In one preferred embodiment, a multi-component resin kit described herein is comprised of a) a humic component for addition to the foundry aggregate; b) a polymerizable liquid polyol component; c) an isocyanate component for reaction with the polyol component to form a polyurethane resin binder; and d) a polyol/isocyanate reaction (polymerization) catalyst component. The components of the kit are then added to the foundry aggregate, stepwise or in combinations. The humic substance is preferably a lignite, preferably leonardite, a polyhydroxylated compound rich in humic acid.

The resins formed in situ from the resin components are used as a binder in combination with a homogeneous mixture of a foundry aggregate, such as sand, and a humic substance, such as leonardite, to produce foundry products including sand/resin foundry mixes, molds, and cores.

DETAILED DESCRIPTION

The foundry shapes described herein, in the preferred embodiment, are formed from an impregnated foundry aggregate by the in situ reaction of a polyol and an isocyanate. In one embodiment, an organic solid having an insoluble component is homogeneously admixed with a foundry aggregate, e.g., sand, to yield the impregnated foundry aggregate. After admixing, the polymerizable polyol, isocyanate, and polymerization catalyst components are added. Another aspect of the resin binders described herein is to provide foundry mixes utilizing the binder components. Further aspects include a process for producing foundry shapes using the binder compositions described herein.

The multi-component kits described herein perform exceptionally well as binders in sand castings. Finished metal castings were produced from foundry shapes formed to a desired shape with the impregnated foundry aggregate admixed with the polymerizable polyol and polymerizable isocyanate, as described in further detail below. Compared to conventional phenol formaldehyde and phenol/isocyanate resin binders, the herein described foundry shapes, possess three significant benefits: 1) superior sand shakeout and better core burn out; 2) non-noxious smoke at during pouring, cooling, and shakeout; and 3) very low odor at mixing. Moreover, the herein described foundry shapes exhibit limited thermal shock and subsequently have a very high hot strength making them superior molds for metal casting. The quality of shakeout is an important consideration because aggregate and binder residue on the finished casting can impair the quality and/or performance of the finished casting.

In one embodiment, the foundry shapes are produced from a four-part binder system comprised of (a) a organic solid component which can be added as a solid to the foundry aggregate, (b) a polymerizable polyol component, (c) a polymerizable isocyanate component, and (d) a catalyst component. Herein, the organic solid has an insoluble component and is completely combustible. In this instance, insoluble means that one of ordinary skill using solvents typical of the art cannot fully solvate the organic solid and completely combustible means that the high temperature pyrolysis of the organic solid leaves no inorganic residue. Preferably, the organic solid is humic organic matter, wherein humic organic matter is a catchall term for biopolymers occurring in soil, sediment, and water. Typically, the humic organic matter is a humic substance, e.g. a humic acid-containing or humic acid salt-containing ore. More preferably, the humic organic matter is a lignite, even more preferably leonardite, previously described in this Assignee's U.S. Pat. Nos. 5,695,554 and 5,688,313, and hereby incorporated by reference.

Preferably, the humic organic matter is a solid lignite component, that contains no more than about 35% water, more preferably about 0 wt. % to about 20 wt. % water, even more preferably about 0 wt. % to about 10 wt. % water, and still more preferably about 0 wt. % to about 5 wt. %, based on the dry weight of the lignite. Preferably, the lignite component is leonardite and incorporated into the foundry mix at a concentration from about 1 to about 70 wt. % of the binder in the final foundry mix, more preferably from about 5 to about 50 wt. %, and even more preferably from about 10 to about 30 wt. %. The concentrations are based on the total dry weight of lignite and the total weight of added, active polymerizable polyol and isocyanate. More preferably, the lignite component is leonardite and incorporated into the foundry aggregate (sand) at a concentration from about 0.01 wt % to about 5 wt. % based on the aggregate weight, even more preferably from about 0.01 wt % to about 1 wt. %, and still more preferably from about 0.1 wt % to about 0.5 wt %. The mean particle size of the leonardite is preferably from about 50 nm to about 500 µm, more preferably from about 500 nm to about 400 µm, even more preferably from about 5 µm to about 300 µm, and still more preferably from about 50 µm to about 200 µm.

Suitable polymerizable polyols include, but are not limited to, glycols and glycerols. Glycols include those linear glycols that have a molecular formula of HO—(CH$_2$CH$_2$O)$_x$—H, where x is a value between 1 and about 25; and the branched polyols that have a molecular formula of HO—(CH$_2$CH$_2$(R)O)$_x$—H, where x is a value between 1 and about 25, and R is a linear, branched, cyclic, alkyl, and/or aromatic group that optionally includes one or more pnictide, chacogenide, and/or halide-containing functionalities. One preferred class of the branched polyols are the glycerols, wherein R contains an alcohol functionality. Suitable polyols additionally include mixed glycols and mixed glycerols. An illustrative example of a mixed glycol is a hydroxy-ethyleneglycol-p-xylene (HOCH$_2$C$_6$H$_4$CH$_2$OCH$_2$CH$_2$OH). Preferably, the polymerizable polyol is a linear glycol having a molecular formula wherein x is a value between 1 and about 10, more preferably wherein x is between 1 and about 5, and even more preferably 3, wherein the glycol is triethylene glycol.

In another embodiment, the polymerizable polyol is a thickened polyol. As used herein, a thickened polyol is a polymerizable polyol that has been admixed with a thickening agent. Suitable thickening agents include homopolymers and copolymers selected from the group consisting of polyethylene glycol/poly(oxyethylene) (PEG), poly(acrylic acid) (PAA), poly(methacrylic acid) (PMA), poly(vinyl alcohol) (PVA), poly(acrylamide), poly(ethylene imine), poly(diallyldimethyl ammonium halide), and poly(vinyl methyl ether); gelatins; and polysaccharides.

Commercial PEG polymers are generally labeled as either PEG-n or PEG M, where (n) refers to the average number of ether oxygen groups or the ethylene oxide (EO) repeat units, and the letter (M) refers to an average molecular weight of the polymer. For example, a PEG with n=150 would have an average molecular weight of about 6,000 Dalton and would be labeled as either PEG-150 or PEG 6000. For consistency herein, the PEG polymers are referred to by the average number of EO repeat units per polymer chain and one of ordinary skill in the art can calculate the average molecular weights of polymers in one denotation to another.

Preferably, the weight average molecular weight of a PEG-based thickening agent is in the range of about 1,000 to about 60,000 Dalton, more preferably about 2,000 to about 30,000 Dalton, and most preferably about 4,000 to about 10,000 Dalton. The weight average molecular weight of non-PEG-based thickening agents can be up to about 5,000,000 Dalton. Preferably, the thickening agent is a non-esterified or a diesterified, homo- or co-polymer of polyethylene glycol (PEG).

Herein, the preferred PEGs are those PEGs in the range of PEG-25 to PEG-1400, more preferably in the range of PEG-45 to PEG-700, even more preferably in the range of PEG-90 to PEG-225, and still more preferably PEG-100, PEG-125, and PEG-150. Herein, the preferred thickening agents are non-esterified, monoesterified, or diesterified esters, where the ester functionality has a linear, branched, cyclic and/or aromatic group. Preferably, the ester functionality is a linear or branched alkyl group with a alkyl chain length equal to or greater than about 8 ($C_8$). More preferably the alkyl chain length is about $C_8$-$C_{18}$, still more preferably the alkyl chain is stearate. Non-limiting examples of thickening agents that correspond to the above recited preferences are PEG-100, PEG-125, PEG-150, PEG-100 strearate, PEG-125 strearate, and PEG-150 strearate, PEG-100 distrearate, PEG-125 distrearate, and PEG-150 distrearate. Other preferably thickening-agents include glyceryl esters, having a weight average molecular weight in the range of about 1,000 to about 15,000 Dalton, more preferably about 2,000 to about 10,000 Dalton, and most preferably about 4,000 to about 7,000 Dalton.

Copolymer thickening agents include those polymers made from two or more different monomers. The preferable monomers include propylene oxide, vinyl acetate, vinyl amine, vinyl chloride, acrylamide, acrylonitrile, ethylene, propylene, ethylene oxide, lauryl methacrylate, methyl methacrylate, hydroxystearate, dimethylsiloxane, diallyldimethyl ammonium halide, ethylenimine, acrylic acid, and methacrylic acid. Preferably, one of the monomers is ethylene oxide. More preferably, the mole-fraction of the comonomer to ethylene oxide in the dispersing agent is preferably $\leq 0.4$, more preferably $\leq 0.3$, and even more preferably $\leq 0.2$.

Yet another class of polymer applicable as a thickening agent includes polyvinylpyrrolidone (PVP) polymers and copolymers. Notably, PVP thickening agents have, preferably, a higher weight average molecular weight than the PEG thickening agents. Preferably, the weight average molecular weight of the PVP thickening agent is in the range of about 1,000 to about 1,000,000 Dalton, more preferably about 4,000 to about 500,000 Dalton, and most preferably about 10,000 to about 100,000 Dalton. For example, one preferred PVP homopolymer thickening agent has a weight average molecular weight of 60,000 Dalton, e.g., (PVP K-30; CAS No. 9003-39-8). Similar to the above disclosed PEG thickening agents, PVP thickening agents can be copolymers, including block and graft copolymers, of pyrrolidone and vinyl acetate, vinyl amine, lauryl methacrylate, methyl methacrylate, acrylic acid, methacrylic acid, hydroxystearate, dimethylsiloxane, diallyldimethyl ammonium halide, and/or ethylenimine.

Preferably, the thickening agent is incorporated into the polymerizable polyol in a concentration of about 0.05 to about 30 wt. %, more preferably about 0.1 to about 20 wt. %, even more preferably about 0.2 to about 15 wt. %, based on the weight of the polymerizable polyol.

The isocyanate component is preferably a polyisocyanate, for example a diisocyanate, a triisocyanate, and so on. The isocyanate component can be either a small molecule isocyanate, a polymeric isocyanate, or a blend of a plurality of isocyanates. Suitable isocyanates include p-phenylene diisocyanate (CAS No. 104-49-4), toluene diisocyanate (CAS No. 1321-38-6), 4,4'-methylenebis(phenylisocyanate) (CAS No. 101-68-8), polymethylene polyphenyl isocyanate (CAS No. 9016-87-9), 1,5-naphthalene diisocyanate (CAS No. 3173-72-6), bitolylene diisocyanate (CAS No. 91-97-4), m-xylene diisocyanate (CAS No. 3634-83-1), m-tetramethylxylene diisocyanate (CAS No. 58067-42-8), hexamethylene diisocyanate, (CAS No. 4098-71-9), 1,6-diisocyanato-2,2,4,4-tetramethylhexane (CAS No. 83748-30-5), 1,6-diisocyanato-2,4,4-trimethylhexane (CAS No. 15646-96-5), trans-cyclohexane-1,4-diisocyanate (CAS No. 2556-36-7), 1,3-bis (isocyanatomethyl)cyclohexane (CAS No. 38661-72-2), 3-isocyanato-methyl-3,5,5-trimethylcyclohexyl isocyanate (CAS No. 4098-71-9), dicyclohexylmethane diisocyanate (CAS No. 5124-30-1) and the polymeric 4,4'-methylene bis (phenylisocyanates) available under the MONDUR product line from BAYER MATERIALSCIENCE. Preferably, the isocyanate component is the "Mondur MR" product available from BAYER MATERIALSCIENCE.

Catalyst components for making rigid polyurethane materials include tin and tertiary amine catalysts. Preferably, the catalyst component favors the gelation reaction (urethane formation) over the blowing reaction (urea formation), as understood in the art. A non-limiting list of applicable catalysts include 1,4-diazabicyclo[2.2.2]octane (DABCO), 1,5-diazabicyclo[4.3.0]non-5-ene (DBN), 1,8-diazabicyclo [5.4.0]undec-7-ene (DBU), pentamethyldipropylenetriamine, bis(dimethylamino ethyl) ether, pentamethyldiethylenetriamine, dimethylcyclohexylamine, tris(3-dimethylamino) propylamine, and other liquid tertiary amines. Preferably, the catalyst component is tris(3-dimethylamino) propylamine.

The type of aggregate and amount of binder used to prepare foundry mixes can vary widely and is known to those skilled in the art. A preferred aggregate is silica sand. Other suitable aggregate materials include olivine, zircon, chromite, carbon, fluid coke, related materials, and aggregate mixtures.

The concentration of the binders, herein including lignite, polyol, and isocyanate, in the foundry mix are preferably from about 0.1 to about 10 wt. %, more preferably from about 1 to about 5 wt. %, more preferably about 1 to about 2.5 wt. %, based on the dry weight of the foundry aggregate. In another embodiment, a weight percentage of the urethane resin in the foundry aggregate is about 0.1 to about 10, based on the weight of the foundry aggregate.

A preferred embodiment of the process for preparing a foundry shape comprises: providing the components of the binder system as described herein, i.e., (1) homogeneously mixing the foundry aggregate with the humic substance; and then: (2) admixing the polymerizable polyol component with the foundry aggregate; (3) admixing the isocyanate component with the foundry aggregate; and (4) admixing the catalyst component with the foundry aggregate. In another preferred embodiment the process comprises: (1) homogeneously mixing the foundry aggregate with the humic substance; and then: (2) admixing the polymerizable polyol with the catalyst component and then admixing this mixture with the foundry aggregate; and (3) admixing the isocyanate component with the foundry aggregate. In another preferred embodiment the process comprises: (1) homogeneously mixing the foundry aggregate with the humic substance; and then: (2) admixing the polymerizable polyol with the foundry aggregate; and (3) admixing the isocyanate component with the catalyst component and then admixing this mixture with the foundry aggregate. Preferably, the foundry mix, e.g. sand together with the lignite, polymerizable polyol, isocyanate, and polymerization catalyst, are homogenously mixed and pressed into a desired shape using a pattern and the foundry shape is then removed from the pattern after curing.

Generally in the art, the mold and the core are made from different foundry mixes. The mold mix commonly comprising a clay binder and the core mix commonly comprising a polymer binder. After casting, the majority of the spent foundry shape is removed from the cast shape by shake-out. During shake-out the majority of the mold breaks free from the casting and some of the core is removed. Often the core-binders are not destroyed during casting and must be physically broken from the internal areas of the core. Following the shake-out process and core-removal, the casting is cleaned, wherein residual aggregate is removed by primarily shot blasting. Here, metal flashing and aggregate is removed from the surface of the casting and metal is often adhered to the aggregate. This multi-step process for isolating a cast shape is time consuming, costly, as well as energy and material intensive. The herein described materials and methods significantly reduce the time and energy necessary for the isolation of a cast shape by improving the shake-out, the core removal process, and the number of foundry mixes necessary to make a shape. Preferably, the mold and the core are manufactured with the herein described foundry mix and after casting are cleanly broken from the cast shake during shake-out.

In a preferred embodiment the core is manufactured from the herein described foundry mix. Preferably, the binders in the core shape are fully destroyed by the heat of the liquid metal and following the solidification of the metal flow freely from the core area during shakeout. More preferably, about 30 to about 60% more aggregate is removed during shake-out when the herein described foundry mix is used to form the foundry shape. Even more preferably and possibly due to improved burn-out of the binder, the reclamation costs for the aggregate are decreased by about 20 to about 50%.

The metal casting (an article of manufacture) is preferably formed by pouring liquid metal into the foundry shape. The metal making up the casting and/or the liquid can be any metal capable of being cast in an aggregate shape. Examples of metals include iron, steels, carbon steals, stainless steels, chromium steels, alloys, aluminum, titanium, zinc, copper, silver, gold, platinum, palladium, nickel, cobalt, manganese, and mixtures thereof. Preferably, the liquid metal is poured at a sufficiently high temperature to facilitate the burnout of the core resin.

The compositions and processes described herein have been primarily described and illustrated in terms of their use in the foundry art, but those skilled in the art will recognize that the compositions described herein may also be utilized in other fields, including adhesives, coatings, and composites.

EXAMPLES

The following examples further illustrate the preparation of several foundry mixes within the scope of the present invention. Those skilled in the art will recognize that similar compositions may be prepared containing quantities and species of materials different from those represented in the examples. The lignite particle size was such that 100% by weight of the lignite particles passed through a 200-mesh screen.

Testing was completed on samples prepared by adding dry samples of different lignite powder samples to silica sand; then adding a polyol component; then adding an isocyanate component; and then adding a catalyst. The lignite powder was either Super-Lig or Agro-Lig available from AMERICAN COLLOID CO., used either at the "as received" moisture content of 14%-22%, or dried to approximately 1.0% moisture.

When mixing the foundry mix components, the amount of catalyst used can be adjusted to provide varying "work time" and "strip time" characteristics.

The "work time" (i.e., WT) is the amount of time that the sand can be manipulated in a pattern or core box before the binders begin to react. If the work time is exceeded, the newly formed bonds will be broken and the sand mass will not set properly. The "strip time" (i.e., ST) is the amount of time required before the mold or core may be removed, or stripped, from the pattern or core box and handled. Once the strip time has been reached, the molds or cores may be removed from the pattern or core box for subsequent processing in preparation for pouring.

Generally for preparing the foundry mix, silica sand was weighed into a Carver "S" blade batch type mixer. The sand was then admixed with preweighed dry lignite, admixed with a polyol component, admixed with a isocyanate component, and admixed with a catalyst; the foundry mix was then sufficiently mixed to yield a nearly uniform material.

The castings were poured with molten metal approximately 24 hours after the foundry shape was formed. The pour, the separation of the cast metal form, and the cast metal form were evaluated for such characteristics as smoke emissions, sand collapsibility, and casting finish. These are inherently qualitative measures; where the pours and cast metal forms employing the herein described foundry mixes were compared to pours and cast metal forms employing foundry standard molds and cores.

Example Procedure

General Procedure for Producing Foundry Mix and a Foundry Shape

A batch of 145 kg of silica sand was weighed into a Carver "S" blade batch type mixer. Then, 434 g of lignite (AGRO-LIG with a 20% moisture content available from AMERICAN COLLOID) was added to the sand and the mixture was mixed for approximately two minutes until the blend was visibly homogenous. Separate from the lignite-sand mixture was admixed 780 g of the polyol component (triethylene glycol) and 94 g of the catalyst (a solution of 4-phenyl, propyl pyridine in an aromatic solvent ("PPP") available from ALPHA RESINS). This polyol-catalyst mixture was then added to the lignite-sand mixture and the entire sample was mixed for approximately two minutes. Then 1034 g of the isocyanate component (LEONA B-1 available from ALPHA RESINS) was admixed with the lignite-sand-polyol-catalyst mixture. This foundry mix was mixed for two minutes, then discharged from the mixer and rammed into the pattern. The foundry shape was allowed to cure overnight and then Ni Hard White Iron (27% Chrome) was poured at 1430° C.

|  | Mass (g) | Wt. % to Sand |  |
| --- | --- | --- | --- |
| Sand | 145000 | 100 |  |
| Lignite | 434 | 0.3 |  |
| Polyol | 780 | 1.25 | combined polyol |
| Isocyanate | 1034 |  | isocyanate mass |
| Catalyst | 94 | 12 wt. % to polyol | 5.2 wt. % to polyol/isocyanate |

The amount of catalyst used in this test yielded a work time of about 7 minutes and a strip time of about 14 minutes. This produced a work time/strip time ratio of 50%.

The pour, the separation of the cast metal form, and the cast metal form were evaluated for such characteristics as smoke emissions, sand collapsibility, and casting finish. These are inherently qualitative measures; where the pours and cast metal forms employing the herein described foundry mixes were compared to pours and cast metal forms employing foundry standard molds and cores, e.g., using a Phenolic Urethane (PU) system.

Foundry Trial

Using the procedure outlined above, a cast test shape was manufactured using (Trial 1) a herein described core and mold and (Trail 2) a core and mold manufactured by standard procedures with a Phenolic Urethane binder typical in the art. The trial 1 casting has complete core burn out, leaving only residual matter in the core. The trial 2 casting required core clean out.

Tensile Strength Testing

A series of examples were prepared using the general procedure for making a foundry shape. Likewise a series of control examples were prepared using the same procedure but omitting the humic solid. Table 1 lists the amounts of the components added to 3000 g of silica sand in each example, Table 2 lists the tensile strength in pounds for the examples at set periods of time after mixing.

The foregoing description is given for clearness of understanding only, and no unnecessary limitations should be understood therefrom, as modifications within the scope of the invention may be apparent to those having ordinary skill in the art.

TABLE 1

| | Lignite Type | Moisture content of Lignite | Mass Lignite | Polyol Type | Mass Polyol | Isocyanate Name | Mass Isocyanate | Solvent Mixed with Polyol | Mass Solvent | Catalysts Name | Mass Catalyst |
|---|---|---|---|---|---|---|---|---|---|---|---|
| Example 1 | Super Lig | 14-22% | 6.5 | TEG | 9.7 | Mondur | 17.8 | PC | 2.0 | PPP | 0.6 |
| Example 2 | Super Lig | 14-22% | 9.0 | TEG | 15.0 | Mondur | 11.25 | | 3.75 | TEDA | 0.2 |
| Example 3 | Super Lig | 14-22% | 9.0 | TEG | 15.0 | Mondur | 13.5 | | 1.5 | TEDA | 0.2 |
| Example 4 | Agro-Lig | 16.2% | 9 | TEG | 15.0 | Mondur | 11.25 | | 3.75 | TEDA | 0.2 |
| Example 5 | Agro-Lig | 1.5% | 9 | TEG | 9.7 | Mondur | 17.8 | | 2.0 | PPP | 1.0 |
| Example 6 | Agro-Lig | 1.0% | 9 | TEG | 9.7 | Mondur | 17.8 | | 2.0 | PPP | 1.0 |
| Example 7 | Super Lig | 14-22% | 9 | TEG | 9.7 | Mondur | 17.8 | | 2.0 | PPP | 1.0 |
| Example 8 | Agro-Lig | 16.2% | 4 | TEG | 7.5 | Mondur | 16.7 | | 1.8 | PPP | 1.0 |
| Control 1 | | | | TEG | 9.7 | Mondur | 17.8 | PC | 2.0 | PPP | 0.6 |
| Control 2 | | | | TEG | 15.0 | Mondur | 11.25 | | 3.75 | TEDA | 0.2 |
| Control 3 | | | | TEG | 15.0 | Mondur | 13.5 | | 1.5 | TEDA | 0.2 |
| Control 4 | | | | TEG | 15.0 | Mondur | 11.25 | | 3.75 | TEDA | 0.2 |
| Control 5 | | | | TEG | 9.7 | Mondur | 17.8 | | 2.0 | PPP | 1.0 |
| Control 8 | | | | TEG | 7.5 | Mondur | 16.7 | | 1.8 | PPP | 1.0 |

PPP = Solution of 4-phenyl, propyl pyridine in an aromatic solvent available from ALPHA RESINS
TEDA = Solution of triethyl diamine in an aromatic solvent available from ALPHA RESINS

TABLE 2

| Tensile Strength at | 0.5 hours | 1 hour | 2 hours | 24 hours |
|---|---|---|---|---|
| Example 1 | 99 | 147 | 165 | 165 |
| Example 2 | 187 | 217 | 216 | 246 |
| Example 3 | 143 | 154 | 172 | 213 |
| Example 4 | 111 | 155 | 138 | 143 |
| Example 5 | 199 | 279 | 277 | 287 |
| Example 6 | 232 | 296 | 234 | 224 |
| Example 7 | 120 | 201 | 200 | 213 |
| Example 8 | 182 | 221 | 211 | 146 |
| Control 1 | 107 | 181 | 209 | 178 |
| Control 2 | 188 | 250 | 250 | 227 |
| Control 3 | 110 | 127 | 119 | 197 |
| Control 4 | 170 | 207 | 191 | 196 |
| Control 5 | 153 | 212 | 208 | 187 |
| Control 8 | 48 | 51 | 51 | 49 |

Thermal Distortion Testing

Three samples were tested for thermal distortion. Control Sample 1 was a sand based foundry shape manufactured with a commercial ALPHATHANE NB Binder available from ALPHA RESINS INC., Detroit, Mich. (1.2 wt % to sand, 55/45 Ratio of polyol to isocyanate). Control Sample 2 was a sand based foundry shape manufactured with a commercial triethylene Glycol/MDI 9010 System available from ALPHA RESINS (1.2 wt. % to sand, 25/75 Ratio of polyol to isocyanate). Test Sample 1 was a sand based foundry shape manufactured with the same resin as Control Sample 2 but 0.3 wt. % lignite was premixed with the sand.

The samples were prepared as cores in disc-shapes 50 mm in diameter×8 mm thick. The samples were heated to 750° C. and 850° C. at a ferrostatic head pressures of 4 and 8 in-lbs. The head pressure used represents and is typical of small to medium size iron castings. Test sample 1 showed about 2× better shakeout properties compared to Control Sample A. Test sample 1 showed less distortion when compared to either Control Samples.

What is claimed is:
1. A method of making a foundry mix comprising:
admixing a solid humic substance and a foundry aggregate to form an impregnated foundry aggregate consisting of the humic substance and the foundry aggregate,
admixing a polymerizable liquid polyol with the impregnated foundry aggregate,
admixing a polymerizable isocyanate with the impregnated foundry aggregate, and
admixing a polymerization catalyst with the impregnated foundry aggregate; to yield a foundry mix.
2. The method of claim 1, wherein the humic substance is a lignite.
3. The method of claim 2, wherein the lignite has a moisture content of less than about 35 wt. %.
4. The method of claim 3, wherein the lignite has a moisture content of less than about 10 wt. %.
5. The method of claim 2, wherein the lignite is leonardite.
6. The method of claim 5, wherein the leonardite has an average particle size of about 500 nm to about 500 μm.
7. The process of claim 1, wherein the humic substance is a lignite having moisture content of 0 wt % to about 20 wt %.
8. The method of claim 1, wherein the polymerizable polyol is selected from the group consisting of a glycol having a molecular formula of HO—$(CH_2CH_2O)_x$—H, where x is a value between 1 and about 25, a glycerol, and a mixture thereof.
9. The method of claim 8, wherein the polymerizable polyol is triethyleneglycol.
10. The method of claim 1, wherein the polymerizable isocyanate is a polymeric 4,4'-methylene bis(phenylisocyanate).
11. The method of claim 1, wherein the polymerization catalyst is selected from the group consisting of 1,4-diazabicyclo[2.2.2]octane (DABCO), 1,5-diazabicyclo[4.3.0]non-5-ene (DBN), 1,8-diazabicyclo[5.4.0]undec-7-ene (DBU), pentamethyldipropylenetriamine, bis(dimethylamino ethyl) ether, pentamethyldiethylenetriamine, dimethylcyclohexylamine, tris(3-dimethylamino) propylamine, a liquid tertiary amines, and a mixture thereof.

* * * * *